(12) United States Patent
Hsiang et al.

(10) Patent No.: US 10,659,817 B2
(45) Date of Patent: May 19, 2020

(54) METHOD OF SAMPLE ADAPTIVE OFFSET PROCESSING FOR VIDEO CODING

(71) Applicant: HFI Innovation Inc., Zhubei, Hsinchu County (TW)

(72) Inventors: Shih-Ta Hsiang, New Taipei (TW); Yu-Wen Huang, Taipei (TW)

(73) Assignee: HFI Innovation Inc., Zhubei, Hsinchu County (TW)

( * ) Notice: Subject to any disclaimer, the term of this patent is extended or adjusted under 35 U.S.C. 154(b) by 557 days.

(21) Appl. No.: 14/889,406

(22) PCT Filed: Jul. 15, 2014

(86) PCT No.: PCT/CN2014/082221
§ 371 (c)(1),
(2) Date: Nov. 5, 2015

(87) PCT Pub. No.: WO2015/007200
PCT Pub. Date: Jan. 22, 2015

(65) Prior Publication Data
US 2016/0127747 A1    May 5, 2016

Related U.S. Application Data

(60) Provisional application No. 61/846,130, filed on Jul. 15, 2013.

(51) Int. Cl.
*H04N 19/82* (2014.01)
*H04N 19/46* (2014.01)
(Continued)

(52) U.S. Cl.
CPC ........... *H04N 19/82* (2014.11); *H04N 19/117* (2014.11); *H04N 19/147* (2014.11);
(Continued)

(58) Field of Classification Search
CPC .... H04N 19/82; H04N 19/567; H04N 19/182; H04N 19/117; H04N 19/147; H04N 19/70; H04N 19/91; H04N 19/86
See application file for complete search history.

(56) References Cited

U.S. PATENT DOCUMENTS 6,771,836 B2 *  8/2004  Lawton ................. G06K 9/325
                                                   358/462
7,218,691 B1 *  5/2007  Narasimhan ........ H04L 25/0228
                                                   370/203
(Continued)

FOREIGN PATENT DOCUMENTS

CA    2 840 045       12/2012
CN    102082953 A      6/2011
(Continued)

OTHER PUBLICATIONS

ITU-T, "Series H: Audiovisual and Multimedia Systems—Infrastructure of audiovisual services—Coding of moving video High efficiency video coding", Apr. 2013 (Year: 2013).*
(Continued)

*Primary Examiner* — Philip P. Dang
(74) *Attorney, Agent, or Firm* — Oblon, McClelland, Maier & Neustadt, L.L.P.

(57) ABSTRACT

A method of modified SAO (sample-adaptive offset) processing for a reconstructed picture in a video coding system to improve the performance is disclosed. In one example, a SAO-sign threshold is introduced to determine the sign of the difference between a current reconstructed pixel and a neighboring reconstructed pixel. A range of difference values greater than the negative SAO-sign threshold and smaller than the positive SAO-sign threshold is assigned to have a sign value of 0. In another example, the SAO-offset value is derived by multiplying the SAO-offset sign with a result from applying left shift by the SAO-bit-shift value to (Continued)

the absolute SAO-offset value. In yet another example, the absolute SAO-offset value is coded by truncated Rice (TR) codes and a maximum TR value is indicated by a syntax element.

19 Claims, 9 Drawing Sheets

(51) Int. Cl.
| H04N 19/10 | (2014.01) |
| H04N 19/70 | (2014.01) |
| H04N 19/147 | (2014.01) |
| H04N 19/91 | (2014.01) |
| H04N 19/117 | (2014.01) |
| H04N 19/182 | (2014.01) |
| H04N 19/567 | (2014.01) |
| H04N 19/86 | (2014.01) |

(52) U.S. Cl.
CPC ......... *H04N 19/182* (2014.11); *H04N 19/567* (2014.11); *H04N 19/70* (2014.11); *H04N 19/91* (2014.11); *H04N 19/86* (2014.11)

(56) References Cited

U.S. PATENT DOCUMENTS

| 7,969,466 | B2* | 6/2011 | Nagaoka | B60K 35/00 348/148 |
| 8,175,121 | B2* | 5/2012 | Fukuda | H04N 7/0142 348/441 |
| 8,285,373 | B2* | 10/2012 | Ternes | A61B 5/0255 607/2 |
| 8,417,064 | B2* | 4/2013 | Wakazono | G06T 5/008 382/167 |
| 8,508,811 | B2* | 8/2013 | Safonov | H04N 1/00413 235/451 |
| 8,577,180 | B2* | 11/2013 | Azuma | H04N 19/80 283/100 |
| 8,611,680 | B2* | 12/2013 | Yamamoto | H04N 19/176 382/233 |
| 8,693,769 | B2* | 4/2014 | Wu | G06K 9/00697 382/164 |
| 9,497,455 | B2 | 11/2016 | Yamazaki et al. | |
| 2010/0020866 | A1 | 1/2010 | Marpe et al. | |
| 2012/0177103 | A1* | 7/2012 | Fu | H04N 19/82 375/240.02 |
| 2012/0236936 | A1* | 9/2012 | Segall | H04N 19/105 375/240.08 |
| 2012/0263353 | A1* | 10/2012 | Kitajima | G01S 7/4802 382/106 |
| 2012/0328028 | A1* | 12/2012 | Sadafale | H04N 19/159 375/240.24 |
| 2013/0027590 | A1* | 1/2013 | Park | G06T 5/002 348/241 |
| 2013/0051454 | A1* | 2/2013 | Sze | H04N 19/70 375/240.02 |
| 2013/0051455 | A1* | 2/2013 | Sze | H04N 19/70 375/240.02 |
| 2013/0094568 | A1* | 4/2013 | Hsu | H04N 19/82 375/240.02 |
| 2013/0114677 | A1 | 5/2013 | Baylon et al. | |
| 2013/0114909 | A1* | 5/2013 | Kim | H04N 19/463 382/233 |
| 2013/0177067 | A1* | 7/2013 | Minoo | H04N 19/176 375/240.02 |
| 2013/0177068 | A1* | 7/2013 | Minoo | H04N 19/177 375/240.02 |
| 2013/0208788 | A1* | 8/2013 | Chen | H04N 19/82 375/240.02 |
| 2013/0215958 | A1* | 8/2013 | Song | H04N 19/176 375/240.02 |
| 2013/0250364 | A1* | 9/2013 | Nakagawa | B41J 2/2132 358/3.13 |
| 2013/0308696 | A1* | 11/2013 | Kim | H04N 19/80 375/240.02 |
| 2014/0010480 | A1* | 1/2014 | Cote | G06T 1/20 382/307 |
| 2014/0022339 | A1* | 1/2014 | Dane | H04N 13/144 348/42 |
| 2014/0119430 | A1* | 5/2014 | Matsunobu | H04N 19/13 375/240.02 |
| 2014/0133749 | A1* | 5/2014 | Kuo | G06T 7/90 382/167 |
| 2014/0152780 | A1* | 6/2014 | Kanetake | H04N 13/282 348/50 |
| 2014/0153834 | A1* | 6/2014 | Poyil | G06K 9/00818 382/199 |
| 2014/0192266 | A1* | 7/2014 | Biswas | H04N 5/21 348/607 |
| 2014/0192869 | A1* | 7/2014 | Laroche | H04N 19/176 375/240.12 |
| 2014/0376608 | A1* | 12/2014 | Tourapis | H04N 19/117 375/240.02 |

FOREIGN PATENT DOCUMENTS

| CN | 102227127 | 10/2011 |
| CN | 102742275 A | 10/2012 |
| CN | 103155557 | 6/2013 |
| JP | A2013138395 | 7/2013 |
| WO | WO 2012/092787 | 7/2012 |
| WO | WO 2012/176910 | 12/2012 |
| WO | WO 2013/046990 | 4/2013 |

OTHER PUBLICATIONS

Chih-Ming Fu, "Sample Adaptive Offset in the HEVC Standard", IEEE Transactions on Circuits and Systems for Video Technology, vol. 22, No. 12, Dec. 2012 (Year: 2012).*
Toshiyasu Sugio, "AHG6: a threshold for SAO edge offset", Jul. 11-20, 2012 (Year: 2012).*
Woo-Shik Kim, "AhGS: Offset Scaling in SAO for High Bit-depth Video Coding", Apr. 18-26, 2013 (Year: 2013).*
Benjamin Bross, "Pro1Josed Editorial Improvements for High efficiency video coding (HEVC) Text Specification Draft 8 with Range Extensions", Oct. 10-19, 2012 (Year: 2012).*
ITU-T, "Series H: Audiovisual and Multimedia Systems—Infrastructure of audiovisual services —Coding of moving video High efficiency video coding", Apr. 2013.*
Chih-Ming Fu, "Sample Adaptive Offset in the HEVC Standard", IEEE Transactions on Circuits and Systems for Video Technology, vol. 22, No. 12, Dec. 2012.*
Toshiyasu Sugio, "AHG6: A threshold for SAO edge offset", Jul. 11-20, 2012.*
Woo-Shik Kim, "AhGS: Offset Scaling in SAO for High Bit-depth Video Coding", Apr. 18-26, 2013.*
Benjamin Bross, "Pro1Josed Editorial Improvements for High efficiency video coding (HEVC) Text Specification Draft 8 with Range Extensions", Oct. 10-19, 2012.*
Fu, C.M., et al.; "Sample Adaptive Offset in the HEVC Standard," IEEE Transactions on Circuits and Systems for Video Technology; vol. 22; No. 12; Dec. 2012; pp. 1755-1764.
Sugio, T., et al.; "AHG6: A threshold for SAO edge offset," Joint Collaborative Team on Video Coding (JCT-VC) of TU-T SG 16 WP 3 and ISO/IEC JTC 1/SC 291WG 11; Jul. 2012; pp. 1-8.
Kim, W.S., et al.; "AhG5: Offset Sealing in SAO for High Bit-depth Video Coding;" Joint Collaborative Team on Video Coding (JCT-VC) of ITU-T SG 16 WP 3 and ISO/IEC JTC 1/SC 29/WG 11; Apr. 2013; pp. 1-11.
Bross, B., et al.; "Proposed Editorial Improvements for High efficiency video coding (HEVC) Text Specification Draft 3 with Range Extensions;" Joint Collaborative Team on Video Coding (JCT-VC) of ITU-T SG 16 WP 3 and ISO/IEC JTC 1/SC 29/WG 11; Oct. 2012; pp. 1-282.

(56) References Cited

OTHER PUBLICATIONS

International Search Report dated Oct. 28, 2014, issued in application No. PCT/CN2014/082221.
Examiner's Report dated May 29, 2019 in Canadian Application No. 2,908,323.

* cited by examiner

| | Descriptor |
|---|---|
| if( sps_extension_flag[ 0 ] ) { | |
| ... | |
| if (sample_adaptive_offset_enabled_flag) | |
| adaptive_sao_bit_shift_active_flag | u(1) |
| } | |

| slice_segment_header( ) { | Descriptor |
|---|---|
| ……. | |
| if( sample_adaptive_offset_enabled_flag ) { | |
| slice_sao_luma_flag | u(1) |
| if( ChromaArrayType > 0 ) | |
| slice_sao_chroma_flag | u(1) |
| } | |
| if( slice_sao_luma_flag && adaptive_sao_bit_shift_active_flag ) | |
| sao_luma_bit_shift | ue(v) |
| if( slice_sao_chroma_flag && adaptive_sao_bit_shift_active_flag ) | |
| sao_chroma_bit_shift | ue(v) |
| ……. | |
| } | |

910 brace covers the rows from `if( sample_adaptive_offset_enabled_flag )` through `sao_chroma_bit_shift`.

Fig. 9

| pic_parameter_set_rbsp( ) { | Descriptor |
|---|---|
| ... | |
| if( pps_extension1_flag ) { | |
| ... | |
| sao_luma_bit_shift | ue(v) |
| sao_chroma_bit_shift | ue(v) |
| pps_extension2_flag | u(1) |
| } | |
| if( pps_extension2_flag ) | |
| while( more_rbsp_data( ) ) | |
| pps_extension_data_flag | u(1) |
| rbsp_trailing_bits( ) | |
| } | |

METHOD OF SAMPLE ADAPTIVE OFFSET PROCESSING FOR VIDEO CODING

CROSS REFERENCE TO RELATED APPLICATIONS

The present invention is a National Phase patent application of PCT Application No. PCT/CN2014/082221, filed on Jul. 15, 2014, which claims priority to U.S. Provisional Patent Application, Ser. No. 61/846,130, filed Jul. 15, 2013, entitled "Method and Apparatus for Image and Video Coding with Modified Sample-Adaptive Offset Processing". The priority applications are hereby incorporated by reference in their entireties.

TECHNICAL FIELD

The present invention relates to sample adaptive offset (SAO) processing. In particular, the present invention relates to modified SAO processing to improve the performance of the SAO processing.

BACKGROUND

Motion estimation is an effective inter-frame coding technique to exploit temporal redundancy in video sequences. Motion-compensated inter-frame coding has been widely used in various international video coding standards The motion estimation adopted in various coding standards is often a block-based technique, where motion information such as coding mode and motion vector is determined for each macroblock or similar block configuration. In addition, intra-coding is also adaptively applied, where the picture is processed without reference to any other picture. The inter-predicted or intra-predicted residues are usually further processed by transformation, quantization, and entropy coding to generate compressed video bitstream. During the encoding process, coding artifacts are introduced, particularly in the quantization process. In order to alleviate the coding artifacts, additional processing has been applied to reconstructed video to enhance picture quality in newer coding systems. The additional processing is often configured in an in-loop operation so that the encoder and decoder may derive the same reference pictures to achieve improved system performance. High Efficiency Video Coding (HEVC) is the new-generation international video coding standard developed under the Joint Collaborative Team on Video Coding (JCT-VC).

Figure 1:
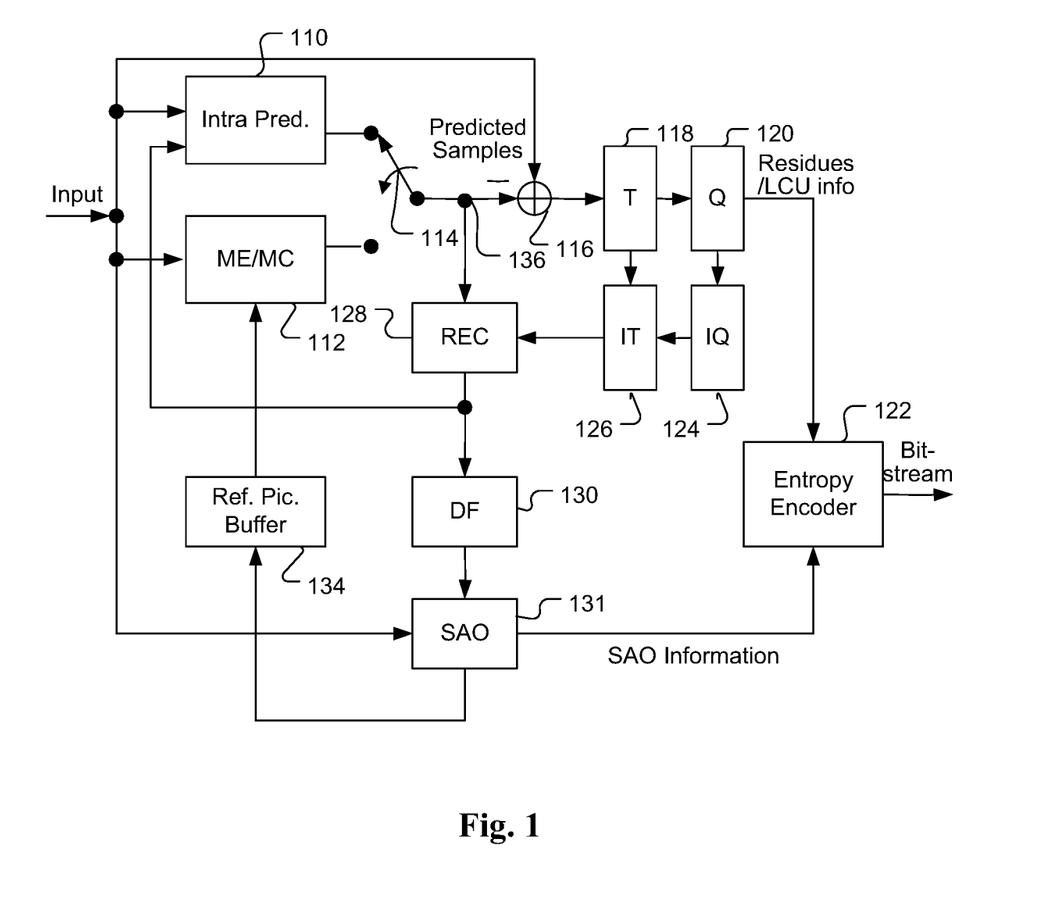
FIG. 1 illustrates a block diagram of an exemplary video encoding system based on the High Efficiency Video Coding (HEVC) standard incorporating sample adaptive offset (SAO) processing.

FIG. 1 illustrates an exemplary system block diagram for a video encoder based on High Efficiency Vide Coding (HEVC) using adaptive Inter/Intra prediction. In the system, a picture is divided into multiple non-overlapped largest coding units, or called coding tree blocks (CTBs). For Inter-prediction, Motion Estimation (ME)/Motion Compensation (MC, 112) is used to provide prediction data based on video data from other picture or pictures. Switch 114 selects Intra prediction data from Intra Prediction 110 or Inter-prediction data from ME/MC 112. The selected prediction data (136) is supplied to Adder 116 to be subtracted from the input video data in order to form prediction errors, also called residues. The prediction error is then processed by Transformation (T) 118 followed by Quantization (Q) 120. The transformed and quantized residues are then coded by Entropy Encoder 122 to form a video bitstream corresponding to the compressed video data. The bitstream associated with the transform coefficients is then packed with side information such as motion, mode, and other information associated with the image area. The side information may also be subject to entropy coding to reduce required bandwidth. Accordingly, the data associated with the side information are provided to Entropy Encoder 122 as shown in FIG. 1. When an Inter-prediction mode is used, a reference picture or pictures have to be reconstructed at the encoder end as well. Consequently, the transformed and quantized residues are processed by Inverse Quantization (IQ) 124 and Inverse Transformation (IT) 126 to recover the residues. The residues are then added back to prediction data 136 at Reconstruction (REC) 128 to reconstruct video data. The reconstructed video data may be stored in Reference Picture Buffer 134 and used for prediction of other frames.

As shown in FIG. 1, incoming video data undergoes a series of processing in the encoding system. The reconstructed video data from REC 128 may be subject to various impairments due to a series of processing. Accordingly, various in-loop processing is applied to the reconstructed video data before the reconstructed video data are stored in the Reference Picture Buffer 134 in order to improve video quality. In the High Efficiency Video Coding (HEVC) standard being developed, Deblocking Filter (DF) 130 and Sample Adaptive Offset (SAO) 131 have been developed to enhance picture quality. The in-loop filter information may have to be incorporated in the bitstream so that a decoder can properly recover the required information. Therefore, in-loop filter information from SAO is provided to Entropy Encoder 122 for incorporation into the bitstream.

The current HEVC standard can only support the 4:0:0 and 4:2:0 picture sampling formats with a pixel depth equal to 8 bits or 10 bits for each color component. However, the range extension of the HEVC is being developed for emerging video coding applications at a high fidelity level such as UHDTV (Ultra-High Definition Television). The extended HEVC standard is expected to be able to further support YUV4:2:2, YUV4:4:4 and RGB4:4:4 picture formats, and the pixel depth can further support 12 bits and 16 bits for each color component.

Figure 2:
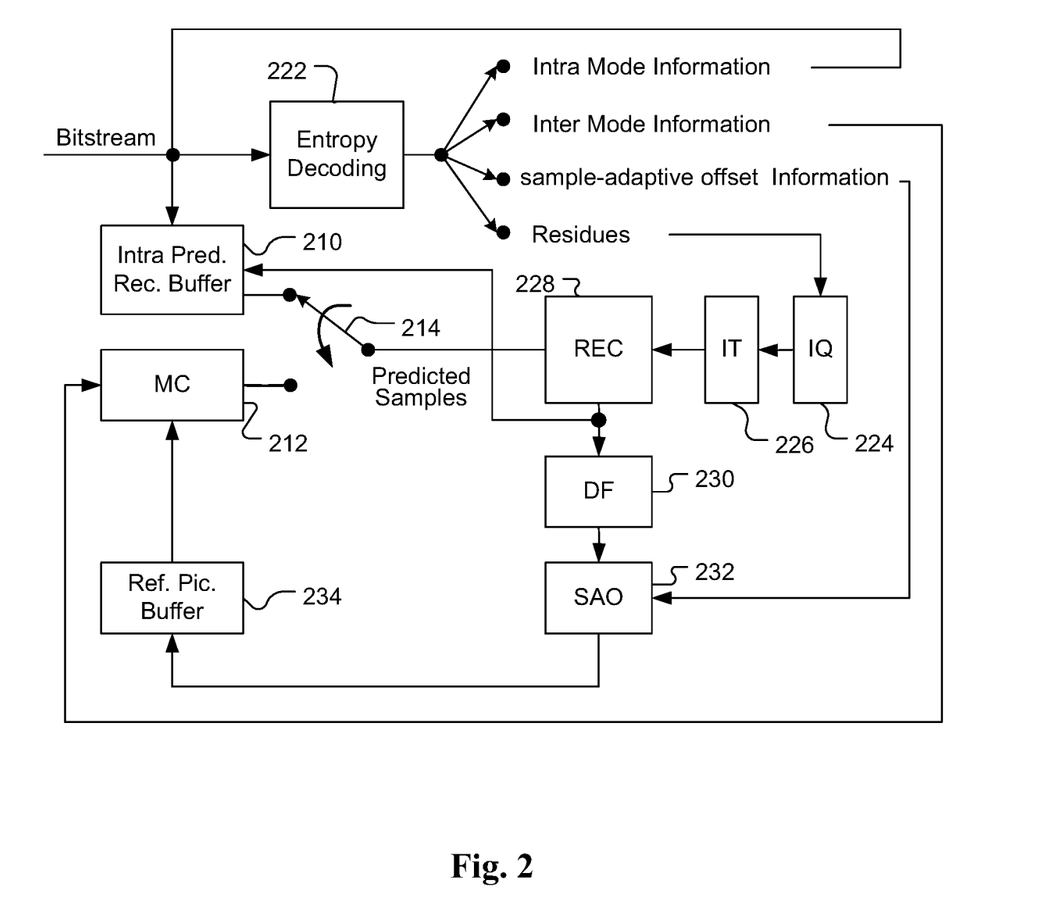
FIG. 2 illustrates a block diagram of an exemplary video decoding system based on the High Efficiency Video Coding (HEVC) standard incorporating sample adaptive offset (SAO) processing.

In the HEVC standard, the sample-adaptive offset (SAO) processing is utilized to reduce the distortion of reconstructed pictures. The SAO processing is performed after deblocking filtering (DF) and is part of the non-deblock filtering (NDFs) operation in. FIG. 2 illustrates a system block diagram of an exemplary HEVC-based decoder including deblocking filter (DF) and SAO. Since the encoder also contains a local decoder for reconstructing the video data, some decoder components are also used in the encoder. For a decoder, entropy decoder 222 is used to parse and recover the coded syntax elements related to residues, motion information and other control data. The switch 214 selects intra-prediction or inter-prediction and the selected prediction data are supplied to reconstruction (REC) 228 to be combined with recovered residues. Besides performing entropy decoding on compressed video data, entropy decoding 222 is also responsible for entropy decoding of side information and provides the side information to respective blocks. For example, intra mode information is provided to intra-prediction 210, inter mode information is provided to motion compensation 212, sample-adaptive offset information is provided to SAO 232 and residues are provided to inverse quantization 224. The residues are processed by IQ 224, IT 226 and subsequent reconstruction process to reconstruct the video data. Again, reconstructed video data from REC 228 undergo a series of processing including IQ 224 and IT 226 as shown in FIG. 2 and are subject to intensity shift. The reconstructed video data are further processed by deblocking filter (DF) 230 and sample adaptive offset (SAO) 232.

The concept of SAO is to classify the reconstructed pixels into categories according to their neighboring pixel values. Each category is then assigned an offset value coded in the bitstream and the distortion of the reconstructed signal is reduced by adding the offset to the reconstructed pixels in each category. In the HEVC standard, the SAO tool supports two kinds of pixel classification methods: band offset (BO) and edge offset (EO).

Figure 3:
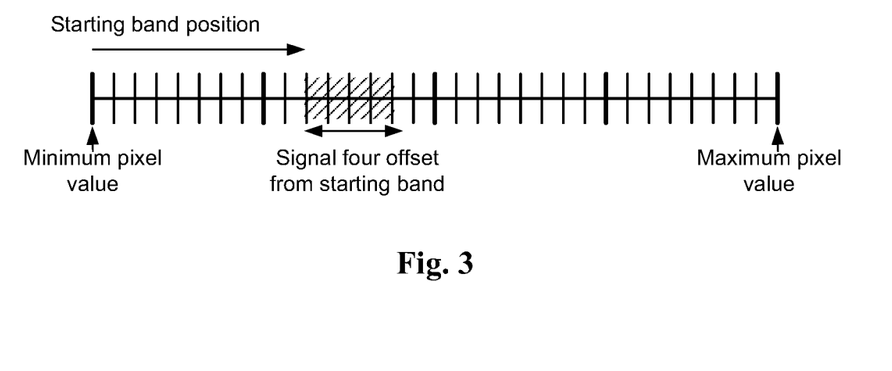
FIG. 3 illustrates sample adaptive offset (SAO) processing by partitioning intensities into multiple bands according to band offset (BO) used by the High Efficiency Video Coding (HEVC) standard.

For BO, the reconstructed pixels are classified into bands by quantizing the pixel magnitude, as shown in FIG. 3. An offset value can then be derived for each band to reduce the distortion of the reconstructed pixels in the band. A group of offsets identified by the starting band position are selected and coded into the bitstream. For each color component (luma or chroma), the SAO algorithm can divide a picture into non-overlapped regions, and each region can select one SAO type among BO (with starting band position), four EO types (classes), and no processing (OFF). The SAO partitioning can be aligned with the CTB boundaries to facilitate the CTB-based processing. The total number of offset values in one picture depends on the number of region partitions and the SAO type selected by each region.

Figure 4:
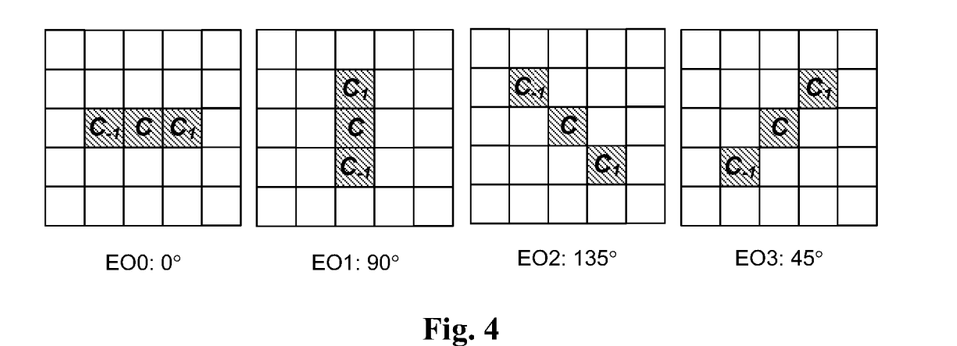
FIG. 4 illustrates the four edge offset (EO) types corresponding to 0-degree, 90-degree, 135-degree and 45-degree used by the High Efficiency Video Coding (HEVC) standard.

For EO, the reconstructed pixels are classified into categories by comparing the current pixel with its neighboring pixels along the direction identified by the EO type as shown in FIG. 4. Table 1 lists the decision for the EO pixel classification according to HEVC, where "c" denotes a current pixel to be classified. The category index, cat_idx, according to the existing HEVC standard for the current pixel "c" is determined by:

$$\text{cat\_idx} = \text{sign}(c-c_1) + \text{sign}(c-c_{-1}) + 2, \text{ and} \quad (1)$$

$$\text{sign}(x) = \begin{cases} 1; & x > 0 \\ 0; & x = 0, \\ -1; & x < 0 \end{cases} \quad (2)$$

where "$c_1$" and "$c_{-1}$" are the neighboring pixels corresponding to a given EO type as shown in FIG. 4. The four EO types with selections of neighboring pixels for different orientations are also shown in FIG. 4. An offset value is derived for all pixels in each category. Four offset values corresponding to category indices 1 through 4 respectively, are coded for one coding tree block (CTB) in HEVC.

TABLE 1

| Category | Condition |
| --- | --- |
| 1 | C < two neighbors |
| 2 | C < one neighbor && C == one neighbor |
| 3 | C > one neighbor && C == one neighbor |
| 4 | C > two neighbors |
| 0 | None of the above |

Figure 5:
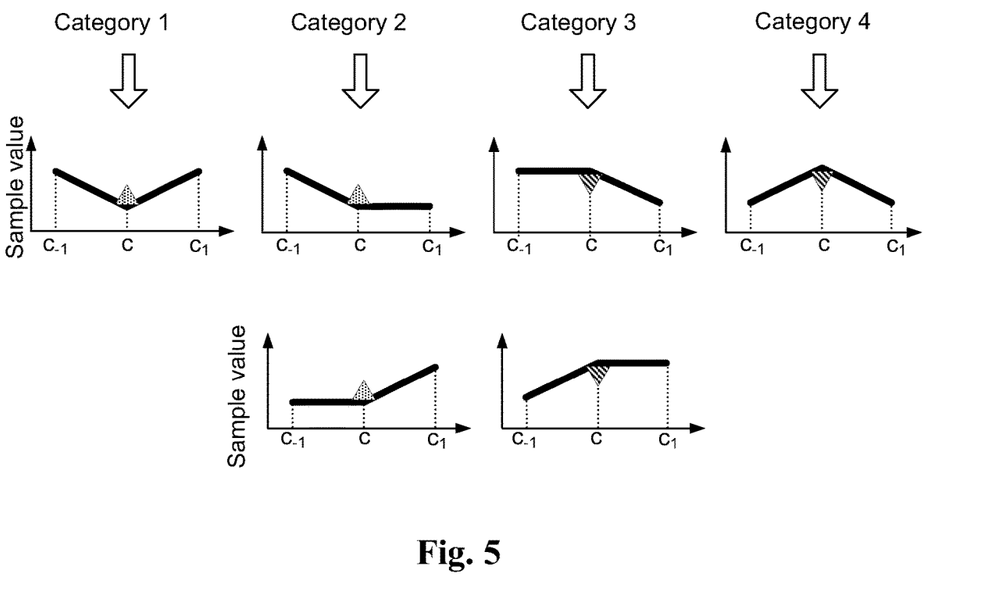
FIG. 5 illustrates exemplary neighboring pixel characteristics corresponding to various EO categories.

The category of EO classification has some physical sense related to the three consecutive samples. As shown in FIG. 5, the scenarios of three neighboring pixels are shown for corresponding categories. For example, category 1 corresponds to a valley and category 4 corresponds to a peak.

In HEVC, a picture is divided into multiple non-overlapped Coding Tree Units (CTUs), each CTU consists of multiple CTBs and each CTB is for one color component.

Figure 6:
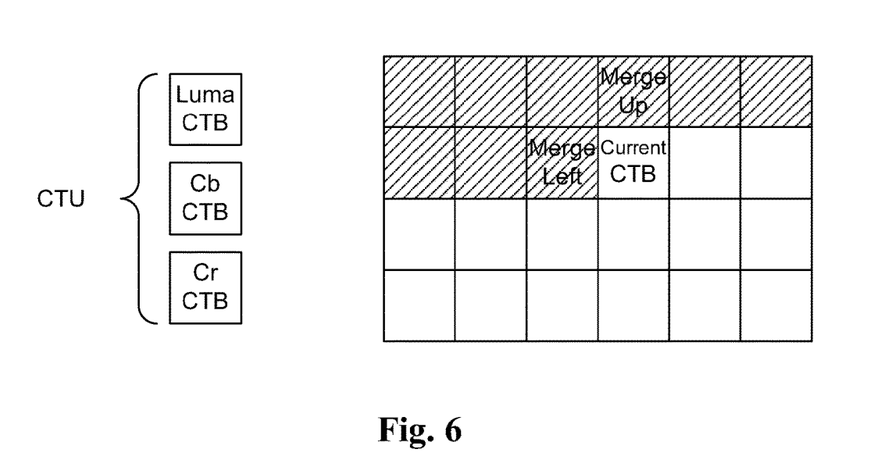
FIG. 6 illustrates SAO information sharing with a neighboring block, where the current CTU (coding tree unit) can reuse SAO parameters of the left or above CTU.

Each CTB can select no processing (SAO-off) or apply one of SAO types or classes (i.e., BO with starting band position index, 0-degree EO, 90-degree EO, 135-degree EO, and 45-degree EO). To further reduce side-information, SAO parameters of a current CTB can reuse those of its upper or left CTB by using Merge syntax as shown in FIG. 6. SAO syntax consists of sao_merge_left_flag, sao_merge_up_flag, sao_type_idx_luma, sao_type_idx_chroma, sao_eo_class_luma, sao_eo_class_chroma, sao_band_position, sao_offset_abs, and sao_offset_sign. Syntax sao_merge_left_flag indicates that the current CTB reuses the parameters of left CTB. The syntax sao_merge_up_flag represents that the current CTB reuses the parameters of upper CTB. The syntax sao_type_idx represents the selected SAO type (i.e., sao_type_idx_luma and sao_type_idx_chroma for luma component and chroma component respectively). The syntax sao_eo_class_luma and sao_eo_class_chroma represent the selected EO type for luma and chroma respectively. The syntax sao_band_position represents the starting band position of the selected bands. cIdx indicates one of three color components. Furthermore, the SAO processing is applied separately to different color components of the video data. The color components may correspond to (Y, Cb, Cr), (Y, U, V) or (R, G, B).

The syntax sao_offset_abs represents the offset magnitude and the syntax sao_offset_sign represents the offset sign. The offset value, SaoOffsetVal, is determined according to:

$$\text{SaoOffsetVal}=\text{offsetSign}*\text{sao\_offset\_abs}<<(\text{bitDepth}-\text{Min}(\text{bitDepth},10)), \quad (3)$$

where bitDepth is the number of the bits used for each component of a raw pixel, offsetSign is equal to −1 when sao_offset_sign is 1, and equal to 1 otherwise. The syntax sao_offset_abs is entropy coded according to the existing HEVC standard using truncated Rice (TR) binarization process with the parameters given by $$c\text{Max}=(1<<(\text{Min}(\text{bitDepth},10)-5))-1, \quad (4)$$

with Rice parameter, cRiceParam equal to 0. The Truncated Rice code is well known in the field for video coding. The TR codes comprise a prefix part represented by truncated unary (TU) codes and a remainder part represented by fixed-length codewords without truncation.

Figure 7:
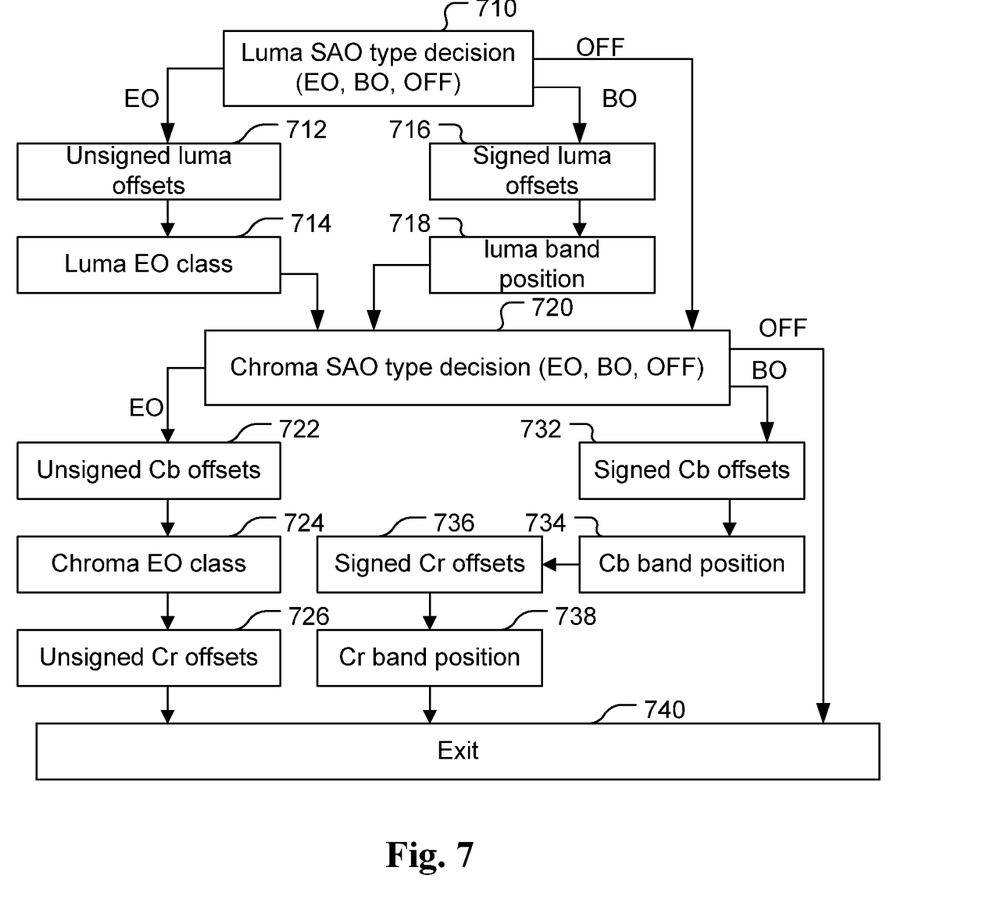
FIG. 7 illustrates coding process to transmit CTU-level SAO information when the current CTU is not merged with the left or above CTU.

FIG. 7 illustrates the coding process for the CTU-level SAO information when the current CTU is not merged with the left or above CTU. Note that EO classes and band position is a kind of sub-class or sub-type to describe the SAO type information.

As shown in FIG. 7, the SAO type decision is made in step 710. If it is an EO type, the unsigned luma offsets (712) and luma EO class (714) are coded in the bitstream. If the SAO type is BO, signed luma offset (716) and luma band position (718) are coded in the bitstream. If SAO type is off, no other SAO information is signaled and the process goes to step 720. Similar SAO information for the chroma components follow. If the chroma components select EO, the unsigned Cb offsets (722), chroma EO class (724) and unsigned Cr offsets (726) are signaled. If the chroma components select BO, the signed Cb offsets (732), Cb band position (734), signed Cr offsets (736) and Cb band position (738) are signaled. The SAO type is off for the chroma components, no other SAO information is signaled and the process goes to step 740.

While the SAO process in the existing HEVC standard is able to improve performance by adaptively compensate the local intensity offset, it is desirable to further improve the performance whenever possible in order to achieve an overall efficiency target.

SUMMARY

A method of modified SAO (sample-adaptive offset) processing for a reconstructed picture in a video coding system to improve the performance is disclosed. In one embodiment, a SAO-sign threshold is introduced to determine the sign of the difference between a current reconstructed pixel and a neighboring reconstructed pixel. A range of difference values greater than the negative SAO-sign threshold and smaller than the positive SAO-sign threshold is assigned to have a sign value of 0. Two SAO signs are determined for the two differences between the current reconstructed pixel and two corresponding neighboring reconstructed pixels. An EO classification index for the current reconstructed pixel is then determined based on the two SAO signs. The current reconstructed pixel is then SAO compensated accordingly. The current reconstructed pixel and two corresponding neighboring reconstructed pixels correspond to three consecutive pixels in a horizontal direction, a vertical direction, a 45-degree diagonal direction or a 135-degree diagonal direction. A syntax element corresponding to the SAO-sign threshold can be signaled in a bitstream, such as a slice header. The SAO-sign threshold can be determined at an encoder side of the video coding system according to a rate-distortion optimization (RDO) procedure.

In another embodiment, the SAO-offset value associated with the EO classification index or BO starting band position for the current reconstructed pixel can be determined according to a SAO-offset sign, an absolute SAO-offset value and a SAO-bit-shift value, where the SAO-offset value is derived by multiplying the SAO-offset sign with a result from applying left shift by the SAO-bit-shift value to the absolute SAO-offset value. The SAO-bit-shift value can be set to 0 when quantization parameters (QP) associated with the current reconstructed pixel is smaller than a first threshold and the first threshold is dependent on bit depth of video data. A syntax element corresponding to the SAO-bit-shift value can be signaled in a bitstream, such as a slice header.

In yet another embodiment, the absolute SAO-offset value is coded by truncated Rice (TR) codes and a maximum TR value is indicated by a syntax element. Separate maximum TR values may be used for different color components of video data for the video coding system. The syntax element for the maximum TR value can be signalled in a picture level or a slice level of a bitstream. The maximum TR value is determined at an encoder side of the video coding system according to a rate-distortion optimization (RDO) procedure.

The above individual modified SAO processing may also be combined.

DETAILED DESCRIPTION

In order to improve the performance of the SAO processing in the existing High Efficiency Video Coding (HEVC) standard, modified SAO processing is disclosed. The modified SAO processing involves modified processing along with introduction of new syntax elements.

In one embodiment according to the present invention, modified SAO sign determination is introduced. The SAO sign according to the existing HEVC standard is the sign of an underlying difference between the current sample (c) and a neighboring sample ($c_1$ or $c_{-1}$) directly as shown in equations (1) and (2). Therefore, only the zero-valued underlying difference has its corresponding sao_sign assigned a value of 0. Embodiments of the present invention extend the data range of the underlying difference to be assigned a value of 0 by introducing a SAO-sign threshold, sao_sign_thre. The SAO sign of the underlying difference according to embodiments of the present invention is determined according to the following equation:

$$\text{sao\_sign}(x) = \begin{cases} 1; & x >= saoSignThre \\ 0; & |x| < saoSignThre \\ -1; & x <= -saoSignThre \end{cases} \quad (5)$$

where variable saoSignThre is specified by the syntax element sao_sign_thre.

Accordingly, an underlying difference having a value greater than −saoSignThre and smaller than saoSignThre will have the sao_sign assigned a value of 0. At the same time, the data ranges associated with sao_sign values, 1 and −1 will be reduced. The syntax element sao_sign_thre is utilized in the modified SAO processing for pixel classification for the EO type. A proper sao_sign_thre value may be selected for a sequence, picture, a slice or other picture unit to achieve improved performance. For example, the encoder may use the rate-distortion procedure to determine a sao_sign_thre value that achieves the best performance. The category index, cat_idx, for the current pixel "c" according to the modified SAO processing is determined in the same way as the HEVC standard, i.e.:

$$\text{cat\_idx} = \text{sao\_sign}(c - c_1) + \text{sao\_sign}(c - c_{-1}) + 2 \quad (6)$$

In another embodiment, a second modification to the SAO processing of the existing HEVC standard is related to representing the SAO offset value, SaoOffsetVal. The syntax element sao_bit_shift is utilized in the modified SAO processing for representing the offset value, SaoOffsetVal, as follows:

$$\text{SaoOffsetVal} = \text{offsetSign} * (\text{sao\_offset\_abs} \ll \text{saoBitShift}), \quad (7)$$

where variable saoBitShift is specified by the syntax element sao_bit_shift. On the other hand, the value for the left shift operation to obtain SaoOffsetVal according to the existing HEVC standard is (bitDepth−Min(bitDepth,10)). The modified SAO operation along to obtain the SAO offset value along with the new syntax element sao_bit_shift can help to improve performance especially for high sample bit depth. This second modification to the SAO processing can be applied to edge offset (EO), band offset (BO), or both.

Figure 8:
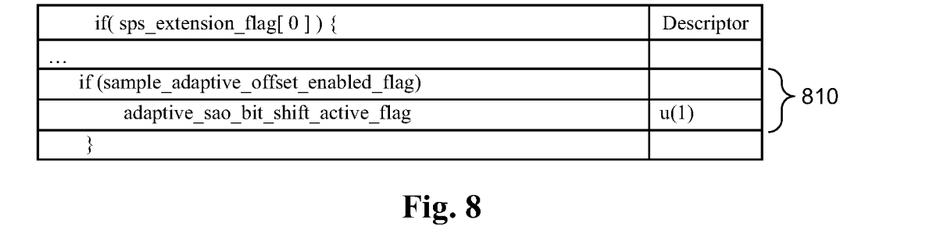
FIG. 8 illustrates an exemplary syntax design to incorporate a SAO bit shift flag in the sequence level according to an embodiment of the present invention.
Figure 9:
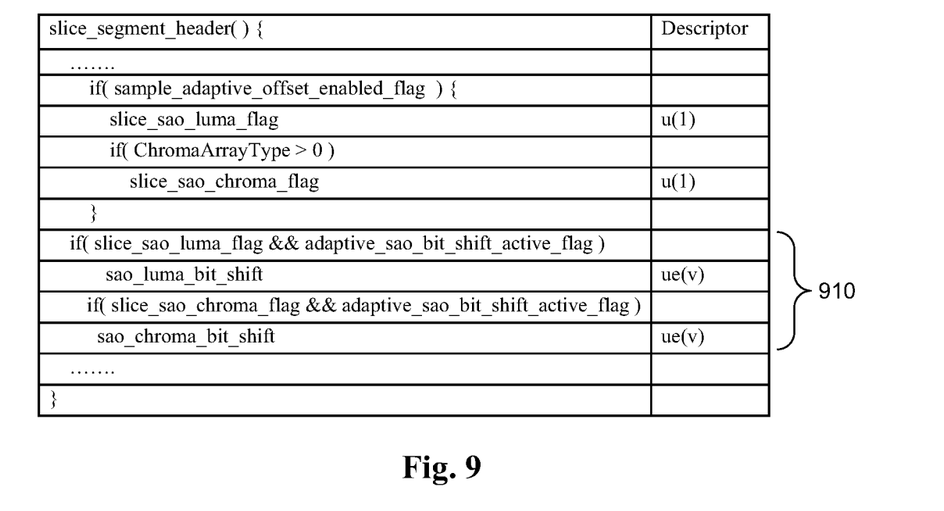
FIG. 9 illustrates an exemplary syntax design to incorporate SAO bit shift values for the luma and chroma components in the slice header according to an embodiment of the present invention.

Sample syntax design to signal the sao_bit_shift according to an embodiment of the present invention is shown in FIG. 8 and FIG. 9. In FIG. 8, a SAO bit shift flag, adaptive_sao_bit_shift_active_flag is incorporated in the sequence parameter set RBSP (raw byte sequence payload) syntax when SAO is enabled as indicated by SAO enable flag, sample_adaptive_offset_enabled_flag. The related syntax elements are indicated by reference number 810 in FIG. 8. If the SAO bit shift flag has a value of 1, it implies that sao_luma_bit_shift and sao_chroma_bit_shift may be present in the slice segment header. If the SAO bit shift flag has a value of 0, it implies that sao_luma_bit_shift and sao_chroma_bit_shift are not present in the slice segment header. When not present, the value of the SAO bit shift flag is inferred to be 0. Syntax element, sao_luma_bit_shift specifies the parameter that is used to derive the SAO offset values for the luma samples. In one embodiment, the value of sao_luma_bit_shift can be in the range from 0 to BitDepth$_Y$-6, inclusive. When not present, the value of sao_luma_bit_shift is inferred to be bitDepth$_Y$−Min(bitDepth$_Y$, 10). Syntax element, sao_chroma_bit_shift specifies the parameter that is used to derive the SAO offset values for the chroma samples. The value of sao_chroma_bit_shift can be in the range from 0 to BitDepth$_C$-6, inclusive. When not present, the value of sao_chroma_bit_shift is inferred to be bitDepth$_C$−Min(bitDepth$_C$, 10). In FIG. 9, it illustrates sample syntax design to incorporate sao_luma_bit_shift and sao_chroma_bit_shift in the slice segment header as indicated by reference number 910.

Figure 10:
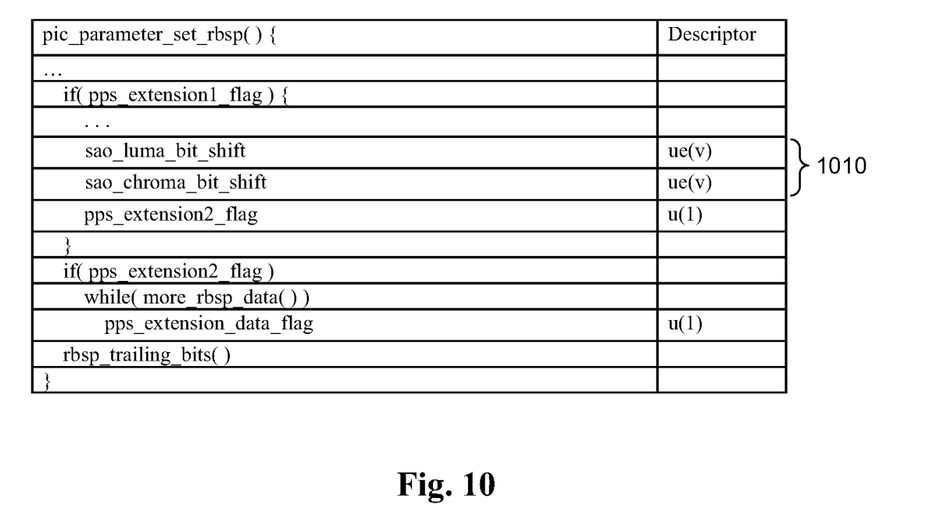
FIG. 10 illustrates an exemplary syntax design to incorporate SAO bit shift values for the luma and chroma components in the sequence level according to an embodiment of the present invention.

FIG. 10 illustrates another sample syntax design incorporating an embodiment of the present invention, where sao_luma_bit_shift and sao_chroma_bit_shift are incorporated in picture parameter set RBSP as indicated by reference number 1010. The SAO bit shift may also incorporated in other locations of the video bitstream such as sequence level.

In the HEVC standard, the absolute offset value is coded using the truncated Rice (TR) codes with the largest possible value (cMax) set according to Equation (4) and Rice parameter (cRiceParam) set to 0. The modified SAO processing according to an embodiment of the present invention uses a new syntax element, sao_offset_max to represent the largest offset value (cMax) directly. With the cMax and cRiceParam specified as shown below, the syntax element sao_offset_abs can be entropy coded using truncated Rice (TR) binarization process accordingly, $$c\text{Max} = \text{saoOffsetMax, and } c\text{RiceParam} = 0$$

where variable saoOffsetMax is specified by syntax element sao_offset_max.

The SAO-bit-shift value can be set to 0 when quantization parameters (QP) associated with the current reconstructed pixel is smaller than a threshold. For example, the threshold can be dependent on the bit depth of video data, where a smaller threshold can be used for larger bit depth.

The performance of a video coding system incorporating an embodiment of the present invention according to modified SAO processing is compared with the performance of a conventional system based on HTM-10.0 as shown in Tables 2-4 for ALL Intra, Random Access and Low Delay B picture coding configurations at various coding tiers (Main, High and Super High) respectively. The BD-rate differences are shown for individual video components (Y, U and V). A negative value in the BD-rate indicates that the present invention has a better performance. As shown in Tables 2-4, the BD-rates for individual components (Y, U and V) incorporating an embodiment of the present invention are reduced by 0.1% to 1.6%.

TABLE 2

| | All Intra Main-tier | | | All Intra High-tier | | | All Intra Super High-tier | | |
| --- | --- | --- | --- | --- | --- | --- | --- | --- | --- |
| | Y | U | V | Y | U | V | Y | U | V |
| RGB 4:4:4 | −0.3% | −0.2% | −0.3% | −0.2% | −0.1% | −0.2% | −0.1% | −0.1% | −0.1% |
| YCbCr 4:4:4 | −0.3% | −0.3% | −0.4% | −0.2% | −0.2% | −0.3% | −0.2% | −0.2% | −0.2% |
| YCbCr 4:2:2 | −0.1% | −0.6% | −0.9% | −0.1% | −0.2% | −0.4% | −0.1% | −0.1% | −0.2% |
| Overall | −0.2% | −0.3% | −0.5% | −0.2% | −0.2% | −0.3% | −0.1% | −0.1% | −0.2% |
| Enc Time [%] | | 106% | | | 105% | | | 105% | |
| Dec Time [%] | | 104% | | | 103% | | | 103% | |

TABLE 3

| | Random Access Main-tier | | | Random Access High-tier | | |
|---|---|---|---|---|---|---|
| | Y | U | V | Y | U | V |
| RGB 4:4:4 | −0.7% | −1.2% | −0.6% | −0.6% | −0.9% | −0.5% |
| YCbCr 4:4:4 | −0.4% | −2.3% | −0.2% | −0.5% | −1.6% | 0.0% |
| YCbCr 4:2:2 | −0.2% | −1.3% | −1.4% | −0.3% | −1.1% | −0.7% |
| Overall | −0.4% | −1.6% | −0.7% | −0.5% | −1.2% | −0.4% |
| Enc Time [%] | | 102% | | | 102% | |
| Dec Time [%] | | 102% | | | 103% | |

TABLE 4

| | Low delay B Main-tier | | | Low delay B High-tier | | |
|---|---|---|---|---|---|---|
| | Y | U | V | Y | U | V |
| RGB 4:4:4 | −0.9% | −1.2% | −1.1% | −0.6% | −0.8% | −0.7% |
| YCbCr 4:4:4 | −0.9% | −2.0% | −0.6% | −0.8% | −1.4% | −0.4% |
| YCbCr 4:2:2 | −0.3% | −1.3% | −1.3% | −0.3% | −0.8% | −0.7% |
| Overall | −0.7% | −1.5% | −1.0% | −0.6% | −1.0% | −0.6% |
| Enc Time [%] | | 101% | | | 101% | |
| Dec Time [%] | | 99% | | | 101% | |

The performance of a video coding system with higher bit depths at 16 bits and 12 bits incorporating an embodiment of the present invention using sao_luma_bit_shift and sao_chroma_bit_shift is compared to the performance of a conventional system based on HTM-10.0 as shown in Table 5 and Table 6 for All Intra and Low Delay coding configurations respectively. The performance comparison is based on different sets of test data listed in the first column. As shown in Table 5, the BD-rates for individual components (Y/G, Cb/B and Cr/R) incorporating an embodiment of the present invention are about the same as the conventional HEVC for the All Intra configuration. However, as shown in Table 6, the BD-rates for individual components (Y/G, Cb/B and Cr/R) incorporating an embodiment of the present invention are reduced by 0.1% to 3.3% for Low Delay B picture configuration.

TABLE 5

| | Average BD-rate Change (%) - All Tiers | | | | | |
|---|---|---|---|---|---|---|
| | Intra 16-bit (internal bit depth) | | | Intra 12-bit (internal bit depth) | | |
| | Y/G | Cb/B | Cr/R | Y/G | Cb/B | Cr/R |
| SVT | 0.0% | 0.0% | 0.0% | 0.0% | 0.0% | 0.0% |
| RExt RGB | 0.0% | 0.0% | −0.1% | −0.1% | 0.0% | −0.1% |
| HDR | 0.1% | 0.0% | 0.0% | 0.1% | 0.0% | 0.0% |
| 4K from HDR | 0.0% | −0.1% | 0.0% | 0.0% | −0.1% | 0.0% |
| HDR 4:0:0 Medical | 0.2% | | | 0.3% | | |
| 4:0:0 Medical | 0.0% | | | 0.0% | | |
| Synthetic RGB HDR (+2 MSBs) | 0.0% | −0.1% | 0.0% | 0.0% | −0.1% | 0.0% |
| Synthetic RGB HDR (+4 MSBs) | 0.0% | 0.0% | 0.0% | 0.0% | 0.0% | 0.0% |
| Synthetic RGB HDR (+6 MSBs) | 0.0% | 0.1% | 0.1% | 0.0% | 0.0% | 0.0% |
| All Classes | 0.0% | 0.0% | 0.0% | 0.0% | 0.0% | 0.0% |

TABLE 6

| | Average BD-rate Change (%) - All Tiers | | | | | |
|---|---|---|---|---|---|---|
| | Lowdelay 16-bit (internal bit depth) | | | Lowdelay 12-bit (internal bit depth) | | |
| | Y/G | Cb/B | Cr/R | Y/G | Cb/B | Cr/R |
| SVT | −0.5% | −0.3% | −0.3% | −0.3% | −0.3% | −0.2% |
| RExt RGB | −0.2% | −0.2% | −0.2% | −0.3% | −0.2% | −0.3% |
| HDR | −0.3% | −0.4% | −0.3% | −0.2% | −0.3% | −0.3% |
| 4K from HDR | | | | | | |
| HDR 4:0:0 Medical | −3.2% | | | −3.3% | | |
| 4:0:0 Medical | −0.7% | | | −0.5% | | |
| Synthetic RGB HDR (+2 MSBs) | −0.1% | −0.3% | −0.2% | −0.1% | −0.3% | −0.2% |
| Synthetic RGB HDR (+4 MSBs) | 0.0% | −0.1% | 0.0% | 0.2% | 0.0% | 0.2% |
| Synthetic RGB HDR (+6 MSBs) | −0.8% | 0.0% | 0.0% | −0.7% | 0.1% | 0.1% |
| All Classes | −0.7% | −0.2% | −0.2% | −0.6% | −0.2% | −0.1% |

Figure 11:
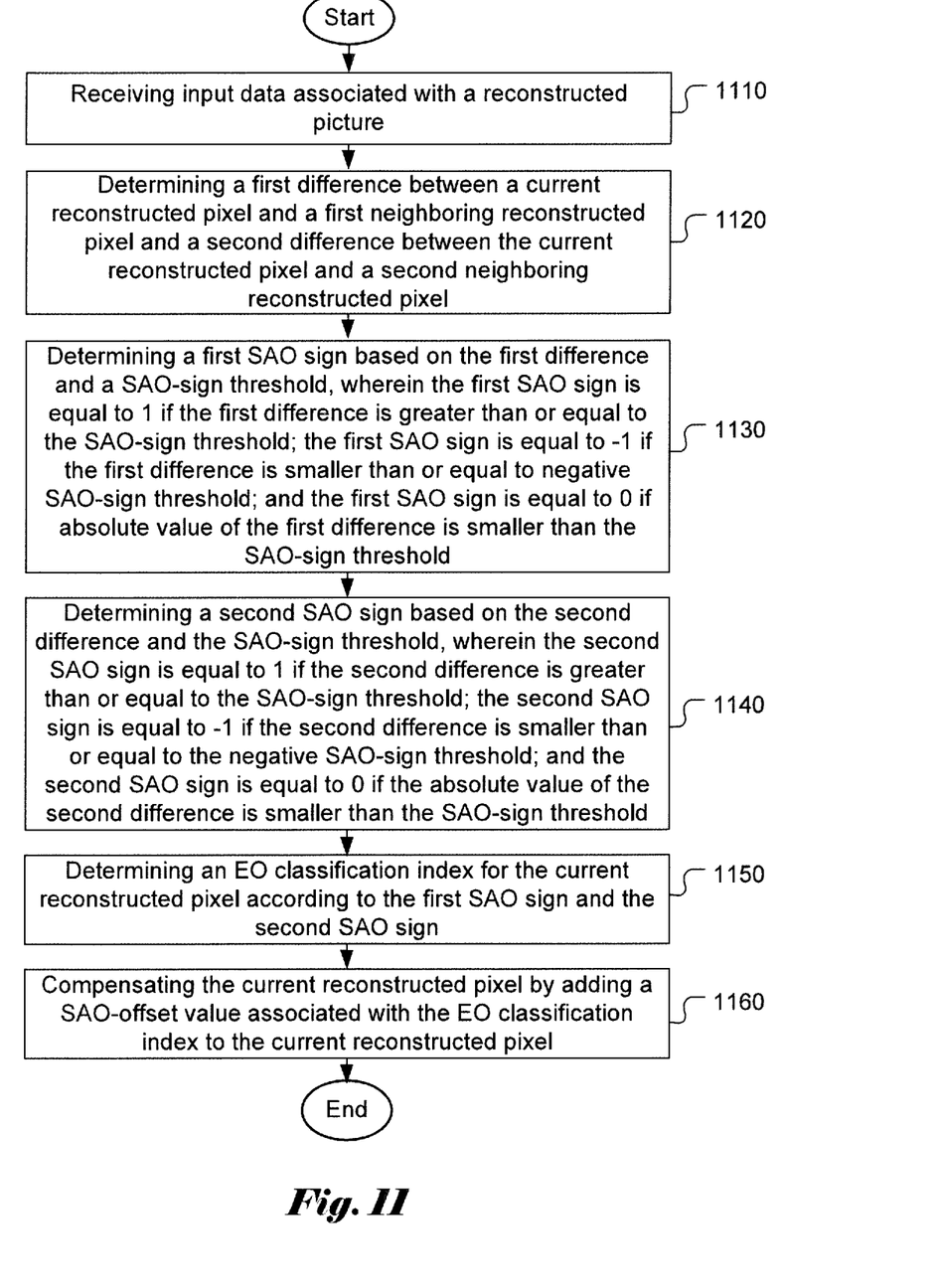
FIG. 11 illustrates an exemplary flowchart for a modified SAO processing incorporating SAO-sign threshold according to an embodiment of the present invention.

FIG. 11 illustrates an exemplary flowchart of SAO processing using a SAO sign threshold according to an embodiment of the resent invention. The system receives input data associated with a reconstructed picture as shown in step 1110. The reconstructed picture may be retrieved from memory or received from a processor. A first difference between a current reconstructed pixel and a first neighboring reconstructed pixel and a second difference between the current reconstructed pixel and a second neighboring reconstructed pixel are determined as shown in step 1120. A first SAO sign based on the first difference and a SAO-sign threshold is determined as shown in step 1130, where the first SAO sign is equal to 1 if the first difference is greater than or equal to the SAO-sign threshold, and the first SAO sign is equal to −1 if the first difference is smaller than or equal to negative SAO-sign threshold, and the first SAO sign is equal to 0 if absolute value of the first difference is smaller than the SAO-sign threshold. A second SAO sign based on the second difference and the SAO-sign threshold is determined in step 1140, where the second SAO sign is equal to 1 if the second difference is greater than or equal to the SAO-sign threshold; the second SAO sign is equal to −1 if the second difference is smaller than or equal to the negative SAO-sign threshold, and the second SAO sign is equal to 0 if the absolute value of the second difference is smaller than the SAO-sign threshold. An EO classification index for the current reconstructed pixel is determined according to the first SAO sign and the second SAO sign as shown in step 1150. The current reconstructed pixel is then compensated by adding a SAO-offset value associated with the EO classification index to the current reconstructed pixel as shown in step 1160.

Figure 12:
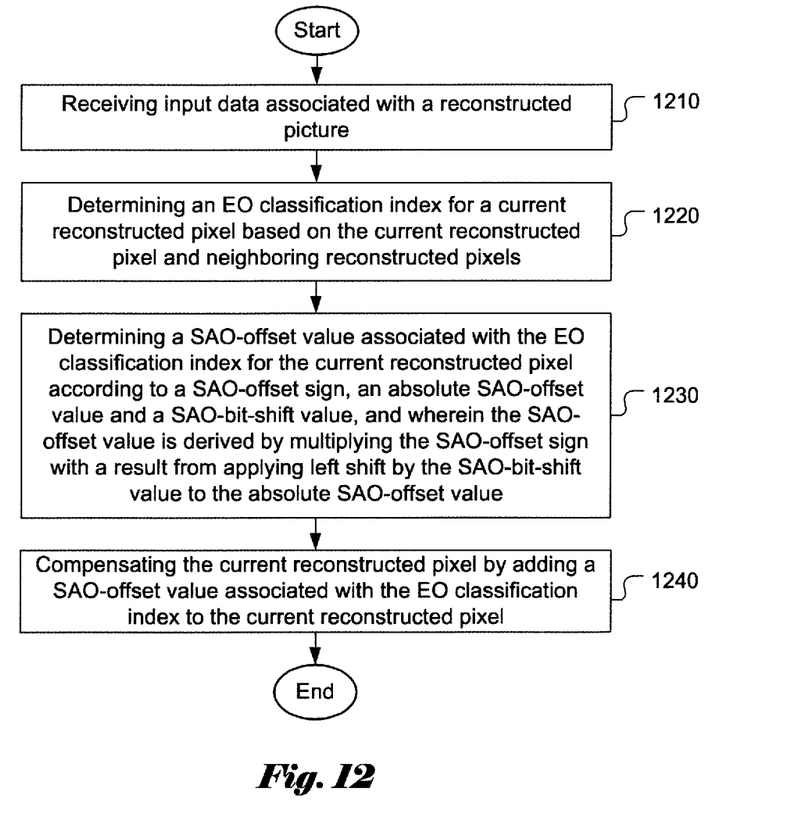
FIG. 12 illustrates an exemplary flowchart for a modified SAO processing incorporating modified SAO processing according to an embodiment of the present invention, where the SAO-offset value is derived by multiply the SAO-offset sign with a result from applying left shift by the SAO-bit-shift value to the absolute SAO-offset value.

FIG. 12 illustrates an exemplary flowchart for a modified SAO processing incorporating modified SAO processing according to an embodiment of the present invention, where the SAO-offset value is derived by multiplying the SAO-offset sign with a result from applying left shift by the SAO-bit-shift value to the absolute SAO-offset value. The input data associated with a reconstructed picture is received in step 1210. An EO classification index or starting band position for BO for a current reconstructed pixel is determined based on the current reconstructed pixel and neighboring reconstructed pixels as shown in step 1220. A SAO-offset value associated with the EO classification index or the BO starting band position for the current reconstructed pixel is determined according to a SAO-offset sign, an absolute SAO-offset value and a SAO-bit-shift value as shown in step 1230. The SAO-offset value is derived by multiplying the SAO-offset sign with a result from applying left shift by the SAO-bit-shift value to the absolute SAO-offset value. The current reconstructed pixel is then compensated by adding the SAO-offset value associated with the EO classification index or the BO starting band position to the current reconstructed pixel as shown in step 1240.

Figure 13:
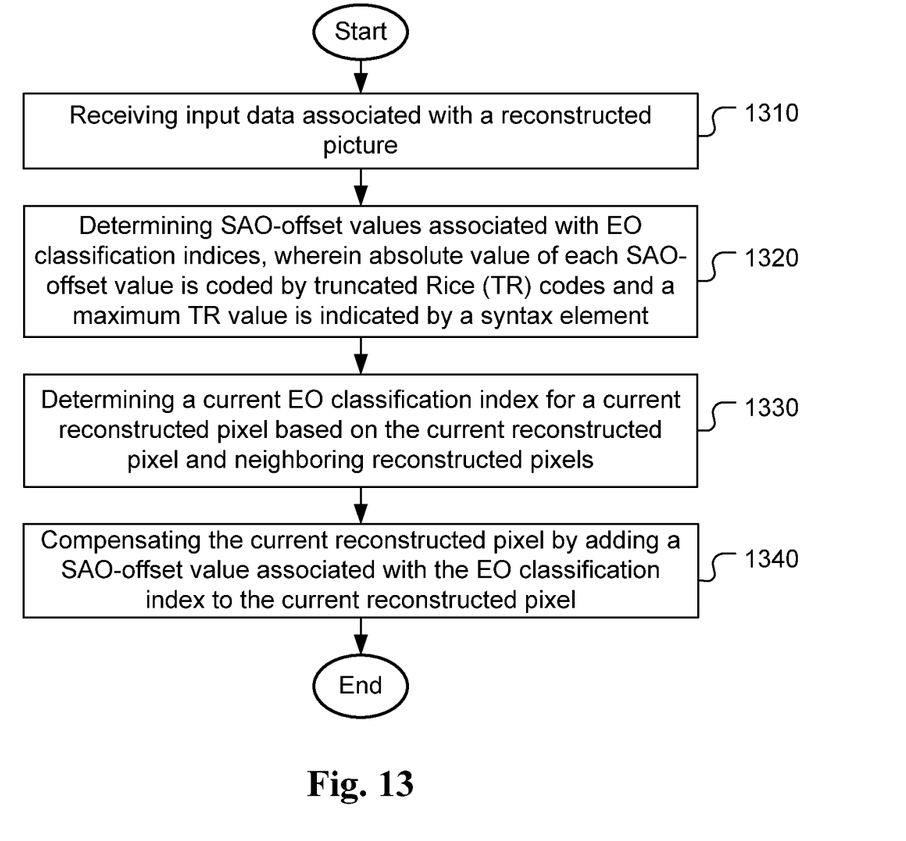
FIG. 13 illustrates an exemplary flowchart for a modified SAO processing incorporating modified SAO processing according to an embodiment of the present invention, where the absolute SAO-offset value is coded by truncated Rice (TR) codes and a maximum TR value is indicated by a syntax element.

FIG. 13 illustrates an exemplary flowchart for a modified SAO processing incorporating modified SAO processing according to an embodiment of the present invention, where the absolute SAO-offset value is coded by truncated Rice (TR) codes and a maximum TR value is indicated by a syntax element. The input data associated with a reconstructed picture is received in step 1310. SAO-offset values associated with EO classification indices are determined as shown in step 1320, where absolute value of each SAO-offset value is coded by truncated Rice (TR) codes and a maximum TR value is indicated by a syntax element. A current EO classification index for a current reconstructed pixel is determined based on the current reconstructed pixel and neighboring reconstructed pixels as shown in step 1330. The current reconstructed pixel is then compensated by adding a SAO-offset value associated with the EO classification index to the current reconstructed pixel as shown in step 1340.

The flowcharts shown above are intended to illustrate examples of modified SAO processing according to the present invention. A person skilled in the art may modify each step, re-arranges the steps, split a step, or combine steps to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of an edge offset (EO) sample-adaptive offset (SAO) processing for reducing an image noise in a video coding system, the method comprising:

receiving an input data associated with a reconstructed picture;

determining a first difference between a current reconstructed pixel and a first neighboring reconstructed pixel and a second difference between the current reconstructed pixel and a second neighboring reconstructed pixel;

determining a first SAO sign of the first difference based on the first difference and a SAO-sign threshold that is greater than zero according to:

$$\text{the first } SAO \text{ sign} = \begin{cases} 1; x \geq saoSignThre \\ 0; |x| < saoSignThre \\ -1; x \leq -saoSignThre \end{cases}$$

wherein x represents the first difference, and saoSignThre represents the SAO-sign threshold; the first SAO sign is equal to 1 if the first difference is greater than or equal to the SAO-sign threshold; the first SAO sign is equal to -1 if the first difference is smaller than or equal to a negative SAO-sign threshold; and the first SAO sign is equal to 0 if an absolute value of the first difference is smaller than the SAO-sign threshold;

determining a second SAO sign of the second difference based on the second difference and the SAO sign threshold according to:

$$\text{the second } SAO \text{ sign} = \begin{cases} 1; y \geq saoSignThre \\ 0; |y| < saoSignThre \\ -1; y \leq -saoSignThre \end{cases}$$

wherein y represents the second difference; the second SAO sign is equal to 1 if the second difference is greater than or equal to the SAO-sign threshold; the second SAO sign is equal to -1 if the second difference is smaller than or equal to the negative SAO-sign threshold; and the second SAO sign is equal to 0 if an absolute value of the second difference is smaller than the SAO-sign threshold;

determining an EO classification index for the current reconstructed pixel based on the first SAO sign of the first difference and the second SAO sign of the second difference according to:

the EO classification index=the first SAO sign+the second SAO sign+2; and compensating the current reconstructed pixel by adding a SAO-offset value associated with the EO classification index to the current reconstructed pixel, wherein the SAO-offset value associated with the EO classification index for the current reconstructed pixel is determined according to a SAO-offset sign, an absolute SAO-offset value and a SAO-bit-shift value, and the SAO-offset value is derived by multiplying the SAO-offset sign with a result from applying a left shift by the SAO-bit-shift value to the absolute SAO-offset value.

2. The method of claim 1, wherein the first neighboring reconstructed pixel, the current reconstructed pixel, and the second neighboring reconstructed pixel correspond to three consecutive pixels in a horizontal direction, a vertical direction, a 45-degree diagonal direction or a 135-degree diagonal direction.

3. The method of claim 1, wherein a syntax element corresponding to the SAO-sign threshold is signaled in a bitstream.

4. The method of claim 3, wherein the syntax element corresponding to the SAO-sign threshold is signaled in a slice header in the bitstream.

5. The method of claim 1, wherein the SAO-sign threshold is determined at an encoder side of the video coding system according to a rate-distortion optimization (RDO) procedure.

6. The method of claim 1, wherein a syntax element corresponding to the SAO-bit-shift value is signaled in a bitstream.

7. The method of claim 6, wherein the syntax element corresponding to the SAO-bit-shift value is signaled in a slice header in the bitstream.

8. The method of claim 1, wherein the absolute SAO-offset value is coded by truncated Rice (TR) codes and a maximum TR value is indicated by a syntax element.

9. The method of claim 1, wherein the SAO-bit-shift value is set to 0 when quantization parameters (QP) associated with the current reconstructed pixel is smaller than a first threshold and the first threshold is dependent on a bit depth of video data.

10. An apparatus of an edge offset (ED) sample-adaptive offset (SAO) processing for reducing an image noise in a video coding system, comprising a circuitry configured to:
receive an input data associated with a reconstructed picture;
determine a first difference between a current reconstructed pixel and a first neighboring reconstructed pixel and a second difference between the current reconstructed pixel and a second neighboring reconstructed pixel;
determine a first SAD sign of the first difference based on the first difference and a SAO-sign threshold that is greater than zero according to;

$$\text{the first } SAO \text{ sign} = \begin{cases} 1; x \geq saoSignThre \\ 0; |x| < saoSignThre \\ -1; x \leq -saoSignThre \end{cases}$$

wherein x represents the first difference, and saoSignThre represents the SAO-sign threshold; the first SAO sign is equal to 1 if the first difference is greater than or equal to the SAO-sign threshold; the first SAO sign is equal to −1 if the first difference is smaller than or equal to a negative SAO-sign threshold; and the first SAO sign is equal to 0 if an absolute value of the first difference is smaller than the SAO-sign threshold;

determine a second SAO sign of the second difference based on the second difference and the SAO sign threshold according to:

$$\text{the second } SAO \text{ sign} = \begin{cases} 1; y \geq saoSignThre \\ 0; |y| < saoSignThre \\ -1; y \leq -saoSignThre \end{cases}$$

wherein y represents the second difference; the second SAO sign is equal to 1 if the second difference is greater than or equal to the SAD-sign threshold; the second SAO sign is equal to −1 if the second difference is smaller than or equal to the negative SAO-sign threshold; and the second SAO sign is equal to 0 if an absolute value of the second difference is smaller than the SAO-sign threshold;

determine an ED classification index for the current reconstructed pixel based on the first SAO sign of the first difference and the second SAO sign of the second difference according to: the ED classification index = the first SAO sign the second SAD sign +2; and compensate the current reconstructed pixel by adding a SAO-offset value associated with the ED classification index to the current reconstructed pixel, wherein the SAD-offset value associated with the ED classification index for the current reconstructed pixel is determined according to a SAO-offset sign, an absolute SAO-offset value and a SAO-bit-shift value, and the SAO-offset value is derived by multiplying the SAO-offset sign with a result from applying a left shift by the SAO-bit-shift value to the absolute SAO-offset value.

11. The apparatus of claim 10, wherein the circuitry is configured to signal a syntax element corresponding to the SAO-sign threshold in a bitstream.

12. The apparatus of claim 10, wherein the circuitry is configured to determine the SAO-sign threshold according to a rate-distortion optimization (RDO) procedure.

13. The apparatus of claim 10, wherein the circuitry is configured to signal a syntax element corresponding to the SAO-bit-shift value in a bitstream.

14. The apparatus of claim 10, wherein the absolute SAO-offset value is coded by truncated Rice (TR) codes and a maximum TR value is indicated by a syntax element.

15. A non-transitory computer-readable medium storing instructions that, when executed by a processor, cause the processor to perform a method of an edge offset (EO) sample-adaptive offset (SAO) processing for reducing an image noise in a video coding system, the method comprising:

receiving an input data associated with a reconstructed picture;

determining a first difference between a current reconstructed pixel and a first neighboring reconstructed pixel and a second difference between the current reconstructed pixel and a second neighboring reconstructed pixel;

determining a first SAO sign of the first difference based on the first difference and a SAO-sign threshold that is greater than zero according to;

$$\text{the first } SAO \text{ sign} = \begin{cases} 1; & x \geq saoSignThre \\ 0; & |x| < saoSignThre \\ -1; & x \leq -saoSignThre \end{cases}$$

wherein x represents the first difference, and saoSignThre represents the SAO-sign threshold; the first SAO sign is equal to 1 if the first difference is greater than or equal to the SAO-sign threshold; the first SAO sign is equal to −1 if the first difference is smaller than or equal to a negative SAO-sign threshold; and the first SAO sign is equal to 0 if an absolute value of the first difference is smaller than the SAO-sign threshold;

determining a second SAO sign of the second difference based on the second difference and the SAO sign threshold according to:

$$\text{the second } SAO \text{ sign} = \begin{cases} 1; & y \geq saoSignThre \\ 0; & |y| < saoSignThre \\ -1; & y \leq -saoSignThre \end{cases}$$

wherein v represents the second difference; the second SAO sign is equal to 1 if the second difference is greater than or equal to the SAO-sign threshold; the second SAO sign is equal to −1 if the second difference is smaller than or equal to the negative SAO-sign threshold; and the second SAO sign is equal to 0 if an absolute value of the second difference is smaller than the SAO-sign threshold;

determining an EO classification index for the current reconstructed pixel based on the first SAO sign of the first difference and the second SAO sign of the second difference according to:

the EO classification index = the first SAO sign + the second SAO sign +2; and compensating the current reconstructed pixel by adding a SAO-offset value associated with the EO classification index to the current reconstructed pixel, wherein the SAO-offset value associated with the EO classification index for the current reconstructed pixel is determined according to a SAO-offset sign, an absolute SAO-offset value and a SAO-bit-shift value, and the SAO-offset value is derived by multiplying the SAO-offset sign with a result from applying a left shift by the SAO-bit-shift value to the absolute SAO-offset value.

16. The non-transitory computer-readable medium of claim 15, wherein a syntax element corresponding to the SAO-sign threshold is signaled in a bitstream.

17. The non-transitory computer-readable medium of claim 15, wherein the SAO-sign threshold is determined at an encoder side of the video coding system according to a rate-distortion optimization (RDO) procedure.

18. The non-transitory computer-readable medium of claim 15, wherein a syntax element corresponding to the SAO-bit-shift value is signaled in a bitstream.

19. The non-transitory computer-readable medium of claim 15, wherein the absolute SAO-offset value is coded by truncated Rice (TR) codes and a maximum TR value is indicated by a syntax element.

* * * * *